(12) United States Patent
Enenkl et al.

(10) Patent No.: US 8,659,701 B2
(45) Date of Patent: Feb. 25, 2014

(54) USAGE OF DITHER ON INTERPOLATED FRAMES

(71) Applicant: Sony Corporation, Tokyo (JP)

(72) Inventors: Michael Enenkl, Stuttgart (DE); Piergiorgio Sartor, Fellbach (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/706,763

(22) Filed: Dec. 6, 2012

(65) Prior Publication Data

US 2013/0155319 A1 Jun. 20, 2013

(30) Foreign Application Priority Data

Dec. 19, 2011 (EP) .................................... 11194293

(51) Int. Cl.
*H04N 11/20* (2006.01)
*H04N 5/21* (2006.01)

(52) U.S. Cl.
USPC ........................................... 348/441; 348/607

(58) Field of Classification Search
USPC .................. 348/441, 607, 701, 625, 571; 345/596–599, 690; 358/3.15–3.19; 382/254, 274, 275
See application file for complete search history.

(56) References Cited

U.S. PATENT DOCUMENTS

| 5,189,406 | A | * | 2/1993 | Humphries et al. | .......... 345/693 |
|---|---|---|---|---|---|
| 5,703,621 | A | * | 12/1997 | Martin et al. | ................. 345/690 |
| 6,462,728 | B1 | * | 10/2002 | Janssen et al. | ................. 345/100 |
| 6,727,913 | B2 | * | 4/2004 | Hoppenbrouwers et al. | . . 345/690 |
| 6,985,126 | B2 | * | 1/2006 | Hoppenbrouwers et al. | ... 345/60 |
| 7,190,380 | B2 | | 3/2007 | Damera-Venkata et al. | |
| 7,705,802 | B2 | * | 4/2010 | Park | ............................... 345/60 |
| 8,026,836 | B2 | * | 9/2011 | Rotenstein | ...................... 341/50 |
| 2005/0052703 | A1 | * | 3/2005 | Pettitt et al. | .................... 358/3.19 |
| 2005/0069209 | A1 | * | 3/2005 | Damera-Venkata et al. | . 382/204 |
| 2005/0253972 | A1 | * | 11/2005 | Wwitbruch et al. | .......... 348/797 |
| 2006/0145975 | A1 | * | 7/2006 | Kempf et al. | .................... 345/84 |
| 2006/0170699 | A1 | * | 8/2006 | Morgan et al. | ................ 345/592 |
| 2008/0055470 | A1 | * | 3/2008 | Garg et al. | ..................... 348/564 |
| 2008/0240230 | A1 | * | 10/2008 | Oxman et al. | ........... 375/240.01 |
| 2009/0096932 | A1 | * | 4/2009 | Lee et al. | ...................... 348/699 |
| 2009/0154831 | A1 | * | 6/2009 | Lee et al. | ...................... 382/269 |
| 2009/0201318 | A1 | * | 8/2009 | Silverstein et al. | ........... 345/690 |
| 2009/0303248 | A1 | | 12/2009 | Ng | |
| 2010/0123648 | A1 | * | 5/2010 | Miller et al. | .................... 345/76 |
| 2013/0176485 | A1 | * | 7/2013 | Aiba | ............................ 348/441 |

* cited by examiner

*Primary Examiner* — Victor Kostak
(74) *Attorney, Agent, or Firm* — Oblon, Spivak, McClelland, Maier & Neustadt, L.L.P.

(57) ABSTRACT

The present invention relates to an image processing method comprising providing video image frames with a first frame rate, up-converting said frame rate to provide video image frames with a second frame rate, and applying dithering to said video image frames with said second frame rate.

16 Claims, 2 Drawing Sheets

USAGE OF DITHER ON INTERPOLATED FRAMES

FIELD OF INVENTION

The present invention relates to an image processing method and an image processing system. The invention also relates to a computer program and a computer-readable non-transitory medium.

BACKGROUND OF THE INVENTION

In the field of digital image processing, particularly video image processing, a so-called dithering method is applied, for example to create the illusion of color depth in images with a limited color palette. For example, one common application of dithering is to more accurately display graphics containing a greater range of colors than the hardware is capable of showing. The dithering takes advantage of the human eyes' tendency to mix two colors in close proximity to one another. For example, by alternating each pixel's color value in an LED display, roughly between two approximate colors in the LCD panel's color space, the display panel which natively supports a certain color depth can represent a much higher color depth.

The same principles may also be used for a more accurate luminance in an LCD display in which each pixel only "knows" an ON or OFF state and no intermediate values. By using dithering, the user gets the impression of intermediate luminance values between 0 (off) and 1 (on).

Dithering is frequently used in TV sets, particularly also in TV sets having high frame rate processing units which provide viewer image frames with a high rate of, for example, 200/240 Hz. In such systems, the dithering is applied to the video image frames with a low frame rate, for example 50/60 Hz.

One of the problems of such systems is that the dither will be visible at the high frame rate processing unit.

BRIEF SUMMARY OF INVENTION

It is an object of the present invention to provide an image processing method which overcomes the above-mentioned problem. It is a further object of the present invention to provide an image processing system, as well as a computer program for implementing the inventive method and a computer-readable non-transitory medium.

According to an aspect of the present invention, there is provided an image processing method comprising:
  providing video image frames with a first frame rate,
  up-converting said frame rate to provide video image frames with a second frame rate, and
  applying dithering to said video image frames with said second frame rate.

That is in other words that the dithering is applied not only to the original video image frames with a first frame rate, but also to all intermediate video image frames.

The advantage is that the applied dither is not visible to the user's eye because of the high frame rate of the video image frames. This method can either improve the display of the video image frames or the signal performance.

According to a further aspect of the present invention there is provided an image processing system comprising an image frame up-converting unit adapted to receive video image frames with a first frame rate and to output video image frames with a second frame rate higher than said first frame rate, and a dithering unit adapted to apply dithering to said image frames output by said image frame up-converting unit.

According to still further aspects, a computer program comprising program means for causing a controller, particularly an image controller, to carry out the steps of the method according to the present invention, when said computer program is carried out on a controller, as well as a computer-readable non-transitory medium having instructions stored thereon which, when carried out on a controller, cause the controller to perform the steps of the method according to the present invention are provided.

Preferred embodiments of the invention are defined in the dependent claims. It shall be understood that the claimed system, the claimed computer program and the claimed computer-readable medium have similar and/or identical preferred embodiments as the claimed method and as defined in the dependent claims.

The present invention is based on the idea to apply dithering on the up-converted video image frames, and, hence, also to any interpolated frames displayed between two original video image frames.

It is to be understood that the features mentioned above and those yet to be explained below can be used not only in the respective combinations indicated but also in other combinations or in isolation, without leaving the scope of the present invention.

BRIEF DESCRIPTION OF DRAWINGS

These and other aspects of the present invention will be apparent from and explained in more detail below with reference to the embodiments described hereinafter. In the following drawings.

DETAILED DESCRIPTION OF THE INVENTION

Figure 1:
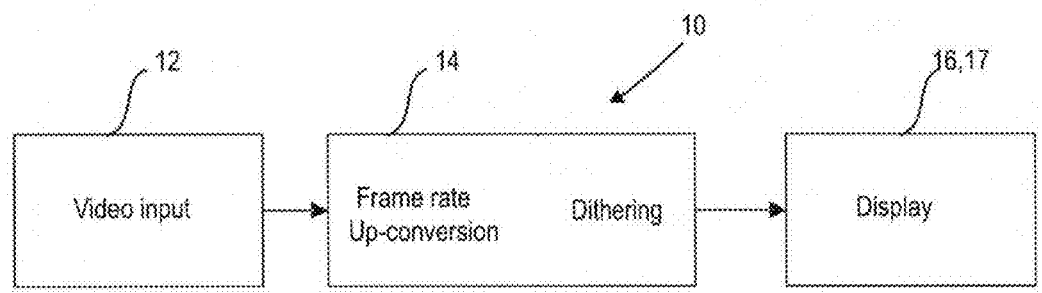
FIG. 1 shows a block diagram of an image processing system according to the present invention in a very general way.

As it is known in the art, digital plasma pixels of a plasma display only have two states, ON or OFF, for displaying information. In order to realize also intermediate intensities, pulse-width modulation techniques (PWM) have been employed, so that a single pixel can display what appears to be other intermediate intensities. PWM involves modulating a pixel back and forth between two different states at such a rate that the human eye integrates the two intensities to perceive a single intensity.

In contrast thereto, present LCD displays uses LCD pixels which are able to render multiple luminance levels, e.g. 6 bit 8 bit or even 10 bit levels. In order to achieve a sufficient quality the minimum luminance level should be at least 10 bit. Nowaday's fast LCD displays can achieve 6 bit or 8 bit, however, LCD displays having 10 bit luminance level are cost intensive and are therefore not used in a great extent. Other techniques for realising intermediate intensities are hence used, like PWM.

In a similar fashion, a method commonly referred to as "dithering" is used to display intensities unobtainable by a single video image frame PWM. As an example, a particular type of dithering called "temporal dithering" is used to display intensity levels that are between the intensity levels that are attainable by PWM. Temporal dithering works similarly to PWM, except that temporal dithering modulates the values attained by PWM. In other words, PWM intensities are attained by modulating 0% and 100% intensities between time slices of a single video image frame, while temporal dithering intensities are attained by modulating these PWM intensities over several frames of data. For example, to display the intermediate pixel value 127.25 on a single pixel, the value 127 is obtained from PWM and is displayed three out of every four frames, while the value 128 (also obtained from PWM) is displayed once every four frames. As a result, a greater number of intensity levels than defined by the PWM scheme can be achieved.

Another dithering method, which is used in combination or as an alternative, is commonly known as "spatial dithering". Spatial dithering involves combining the simultaneous output of a plurality of pixels to achieve intermediate intensity levels. For example, a group of four pixels will appear to have a uniform value of 127.75 if three pixels are illuminated with a value of 128 and the other pixel is illuminated with a value of 127. Similarly, a group of four pixels will appear to have a uniform intensity value of 127.5 if two pixels are illuminated with a value of 127 and the other two pixels are illuminated with a value of 128.

In the art, there are several algorithms designed to perform dithering. One of the earliest and still one of the most popular is the Floyd Steinberg algorithm. One of the strength of this algorithm is that it minimizes visual artefacts through an error-diffusion process. The Floyd Steinberg algorithm achieves dithering by diffusing the quantization error of a pixel to its neighboring pixels according to a predefined distribution.

Similarly, Floyd Steinberg dithering only diffuses the error to neighboring pixels.

In FIG. 1, a section of an image processing system is schematically shown and indicated with reference numeral 10. The image processing system 10 comprises a video input 12 which provides video image frames with a first frame rate, for example 50 Hz. The system further comprises an image processor 14 and a display 16, which is preferably an LCD display 17, preferably of a TV set. It is to be noted here that the display 16 could also be a beamer or any other device for displaying video images.

The image processor 14 receives the image frames from the video input 12 and up-converts the frame rate to a higher value, for example 200 Hz.

The method of up-converting the frame rate is known in the art and will, therefore, not be described in detail here. Generally, the frame rate up-conversion uses motion estimation algorithms to determine motion vectors that describe the transformation from one dimensional image to another, in the present case from adjacent frames of the viewer input. The motion vectors may relate to the whole image (global motion estimation) or specific parts, such as rectangular blocks, arbitrary-shaped patches or even the pixel. The motion vectors may be represented by a translational model or many other models that can approximate the motion of a real video camera, such as rotation and translation in all three dimensions and zoom.

In frame rate up-conversion, determined motion vectors are used to interpolate inter-frames which are displayed between two "original" frames from the video input.

The image processor 14 then applies a dithering on the video image frames with the high frame rate, i.e. on the original image frames and the interpolated image frames.

The image frames with a high frame rate passed through the dithering process are then supplied to the display 16. The display 16 then displays the image frames.

As known in the art, there are several methods for applying dithering. One of them, as already mentioned before, is the Floyd Steinberg dithering algorithm which belongs to the class of error diffusion algorithms. A further dithering method is random dithering (blue noise dithering) wherein each pixel value of an image frame is compared against a random threshold.

Figure 2:
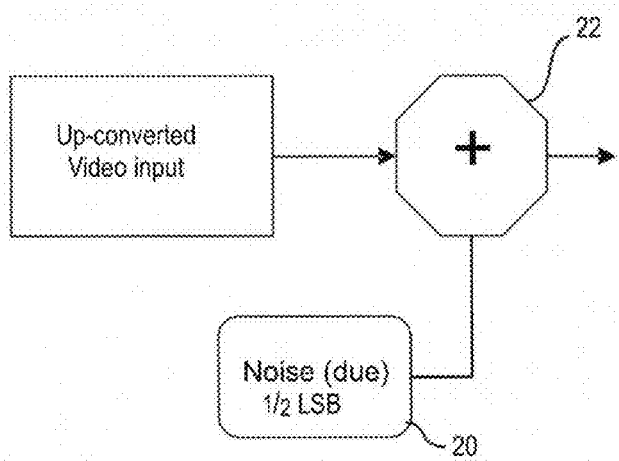
FIG. 2 shows a schematic block diagram of a dithering unit according to a first embodiment.

In FIG. 2, a block diagram of a dithering element using random dithering is shown. A binary value is supplied by a noise generator, preferably a blue noise generator 20. The binary value of the noise generator 20 is added to the binary pixel value of the up-converted image frame, namely the interpolated image frame. When adding both values it has to be ensured that there is no overflow. The signal has therefore to be clipped within the respective range, e.g. if the binary pixel value is 8 bit long, the allowed range is from 0 to 255. The noise added has a ½ bit amplitude and it thus results in a dithering with quantization. As an example: if the binary pixel value is quantized from 8 bit to 6 bit, the ½ bit amplitude refers to ½ of the missing signal, i.e. 1 bit (8 bit−6 bit=2 bit and 2 bit*½=1 bit).

In the present case the binary pixel value is not quantized but it is regarded as a quantized value. Hence it has to be estimated how much the ½ bit amplitude is. For example if the binary pixel value is an 8 bit value (regarded as quantized to 8 bit) and it is assumed that the "original" value is e.g. 10 bit, the ½ bit amplitude is 1 bit. Further if the "original" value is assumed to be 12 bit, the ½ bit amplitude is 2 bit (12 bit−8 bit=4 bit and 4 bit*½=2 bit).

It is to be noted that increasing the noise level will mask the quantization thus making the image "smooth", but it will also make the image noisy. Hence there is a limit with regard to the assumed quantization. For example an 8 bit binary value and an assumed 16 bit original value would not lead to a reasonable result.

To sum up, the interpolated frames are applied with a random dither without correlation to the original input frames.

Figure 3:
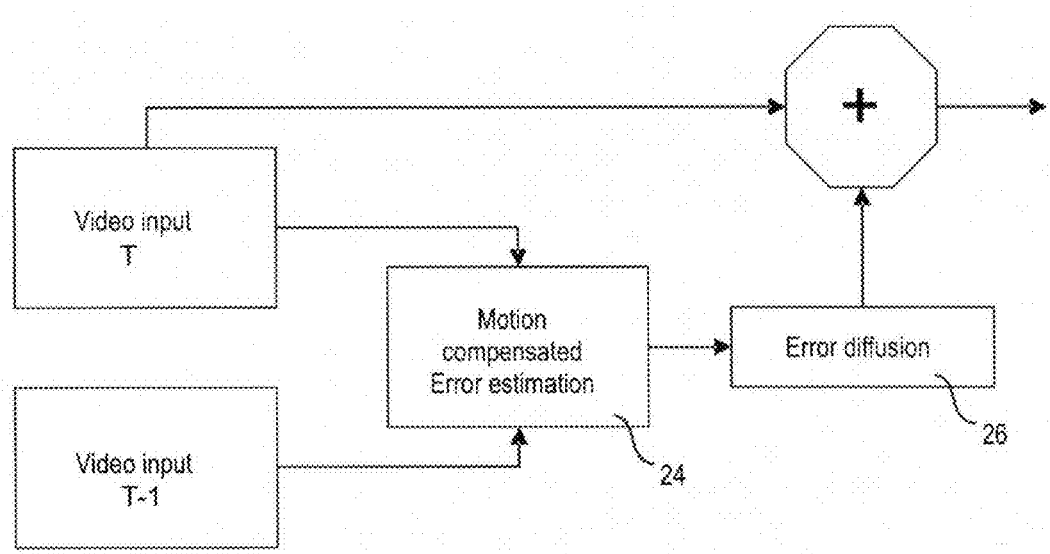
FIG. 3 shows a schematic block diagram of a dithering unit according to a second embodiment.

As shown in FIG. 3, there is another possibility to apply dither to the interpolated frames, namely an inter-frame-dependent dither having a correlation to the original frames.

In FIG. 3, it is shown that two subsequent video image frames are supplied to a motion compensated error estimation unit 24 which, in turn, supplies a signal to an error diffusion unit 26.

Figure 4:
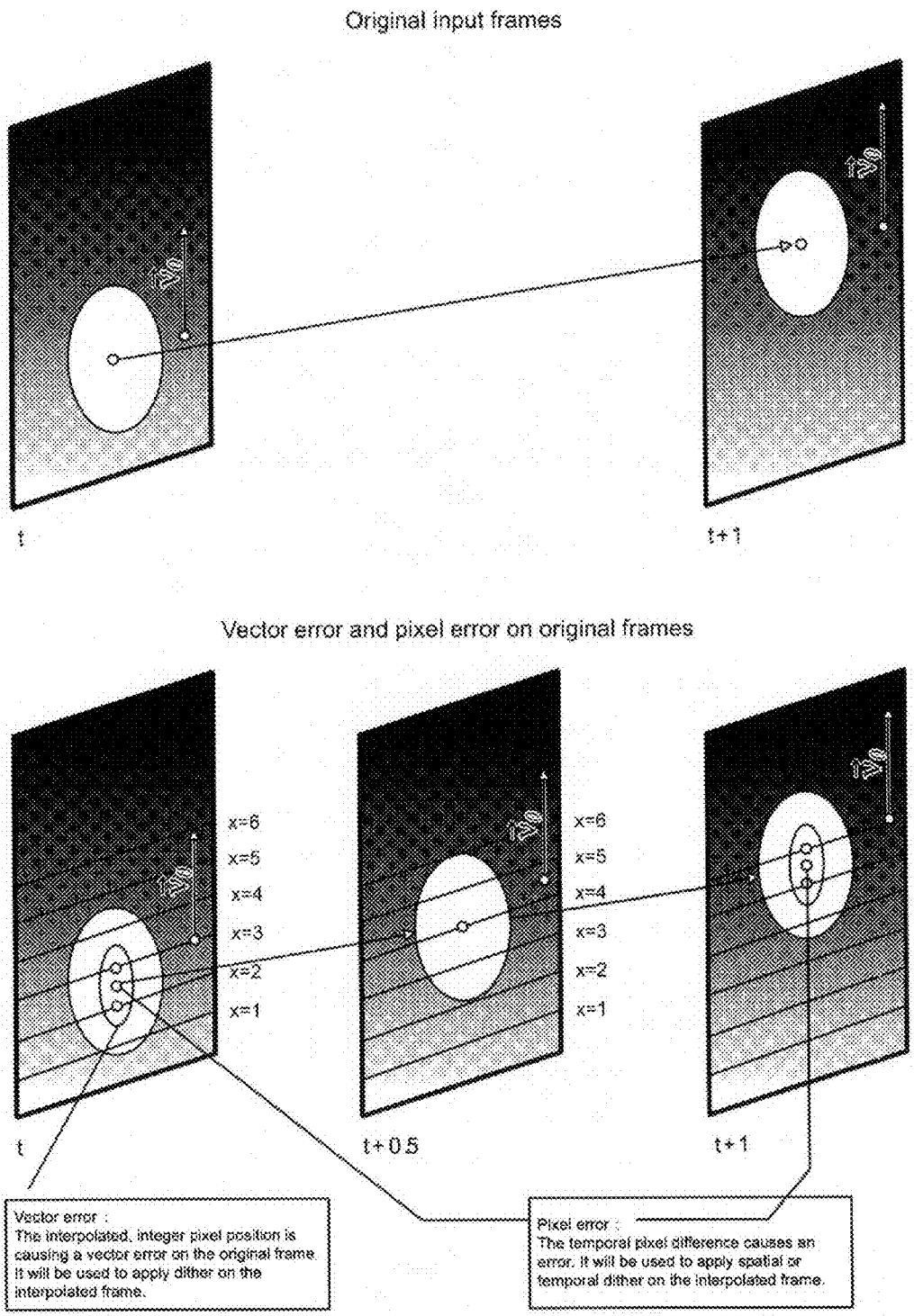
FIG. 4 shows video image frames for explaining the present invention.

The motion compensated error estimation unit 24 estimates vector error and pixel error on original frames on the basis of the data gained by the motion estimation process for interpolating frames. As schematically shown in FIG. 4, an interpolated pixel position in an interpolated frame is causing a vector error on the original frame.

This vector error can be used to apply dither on the interpolated frame.

Further, there is also a pixel error caused by the temporal pixel difference of two subsequent original frames. This pixel error will be used to apply spatial or temporal dither on the interpolated frame.

In this embodiment, the Floyd Steinberg dithering algorithm is used. The result is an inter-frame-dependent dither with correlation to the original frames with the result that inter-frame noise is masked.

To sum up, this embodiment provides a dithering method which also uses motion vectors determined during the frame rate up-conversion, in particular the motion estimation process.

The invention has been illustrated and described in detail in the drawings and the foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

The invention claimed is:

1. An image processing method comprising:
   providing video image frames with a first frame rate;
   up-converting said first frame rate to provide video image frames with a second frame rate;
   determining a pixel error caused by a temporal pixel difference of subsequent image frames; and
   applying dithering, via a processor, to said video image frames with said second frame rate by applying an inter frame dependent spatial or temporal dither with correlation to video image frames based on the pixel error.

2. The method of claim 1, wherein
   said video image frames with said second frame rate include interpolated image frames, and
   said applying dithering includes applying a random dither to the interpolated video image frames.

3. The method of claim 1, wherein
   said video image frames with said second frame rate include interpolated image frames.

4. The method of claim 1, wherein said dithering is based on an error-diffusion algorithm.

5. The method of claim 4, wherein said error-diffusion algorithm is the Floyd Steinberg algorithm.

6. The method of claim 1, wherein said dithering is a temporal dithering applied over several subsequent frames.

7. The method of claim 1, wherein said dithering is a spatial dithering applied in one frame.

8. The method of claim 1, further comprising:
   carrying out motion estimation for interpolating image frames; and
   dithering via information gained by said motion estimation.

9. The method of claim 1, wherein the pixel error is caused by a temporal pixel difference of subsequent original image frames.

10. An image processing system comprising:
    circuitry configured to
       receive video image frames with a first frame rate,
       up-convert said first frame-rate to output video image frames with a second frame rate higher than said first frame rate,
       determine a pixel error caused by a temporal pixel difference of subsequent image frames, and
       apply dithering to said image frames with said second frame rate by applying an inter frame dependent spatial or temporal dither with correlation to video image frames based on the pixel error.

11. The system of claim 10, wherein said circuitry applies, via a noise generator, a random value on the least significant bit of a pixel of an image frame.

12. The system of claim 11, wherein said noise generator is a blue noise generator.

13. The system of claim 10, wherein said circuitry includes an error-diffusion element.

14. The system of claim 13, wherein said error-diffusion element is a Floyd-Steinberg error-diffusion element configured to carry-out the Floyd-Steinberg algorithm.

15. The system of claim 10, wherein said circuitry interpolates image frames.

16. A non-transitory computer readable medium having computer-readable instructions stored thereon which, when executed by a computer, cause the computer to perform the steps of the method as claimed in claim 1.

* * * * *